United States Patent
Kosseifi et al.

(10) Patent No.: US 11,457,249 B2
(45) Date of Patent: Sep. 27, 2022

(54) METHOD AND APPARATUS FOR SMART VIDEO SKIPPING

(71) Applicant: AT&T Intellectual Property I, L.P., Atlanta, GA (US)

(72) Inventors: Mario Kosseifi, Roswell, GA (US); Joseph Thomas, Marietta, GA (US); Kumar Vadlamudi, Frisco, TX (US)

(73) Assignee: AT & T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/090,137

(22) Filed: Nov. 5, 2020

(65) Prior Publication Data
US 2022/0141502 A1 May 5, 2022

(51) Int. Cl.
H04N 21/2343 (2011.01)
H04N 21/235 (2011.01)
H04N 21/234 (2011.01)
H04N 5/14 (2006.01)
G06V 20/40 (2022.01)

(52) U.S. Cl.
CPC ......... *H04N 21/2343* (2013.01); *G06V 20/46* (2022.01); *G06V 20/48* (2022.01); *G06V 20/49* (2022.01); *H04N 5/147* (2013.01); *H04N 21/235* (2013.01); *H04N 21/23418* (2013.01)

(58) Field of Classification Search
CPC ............... H04N 21/2343; H04N 5/147; H04N 21/23418; H04N 21/235; H04N 21/23412; H04N 21/252; H04N 21/4542; H04N 21/454; H04N 21/4545; H04N 21/4662; H04N 21/4666; G06K 9/00744; G06K 9/00758; G06K 9/00765
See application file for complete search history.

(56) References Cited

U.S. PATENT DOCUMENTS

| | | | |
|---|---|---|---|
| 2006/0130118 A1* | 6/2006 | Damm | H04N 21/8456 725/135 |
| 2008/0250080 A1* | 10/2008 | Arrasvuori | G06F 16/435 |
| 2012/0311625 A1* | 12/2012 | Nandi | H04N 21/4532 725/28 |
| 2016/0227277 A1* | 8/2016 | Schlesinger | H04N 21/44218 |
| 2017/0062009 A1* | 3/2017 | Clifton | G11B 27/031 |
| 2017/0272818 A1* | 9/2017 | Gattis | H04N 21/4415 |
| 2021/0037271 A1* | 2/2021 | Bikumala | G06K 9/00281 |

* cited by examiner

*Primary Examiner* — Nnenna N Ekpo
(74) *Attorney, Agent, or Firm* — Guntin & Gust, PLC; Kenneth Kwan

(57) ABSTRACT

Aspects of the subject disclosure may include obtaining a first media content item comprising a plurality of content segments. For each content segment of the plurality of content segments of the first media content item, comparing the content segment and a prior content segment to identify a content transition, analyzing the content segment to identify a content marker in the content segment, determining a viewing characteristic of the content segment according to the content transition and the content marker, determining if the content segment is unnecessary according to the viewing characteristic, and updating a set of skipping instructions associated with the first media content item responsive to the determining the content segment is unnecessary, and presenting the first media content item at a first device according to the set of skipping instructions associated with the first media content item. Other embodiments are disclosed.

20 Claims, 7 Drawing Sheets

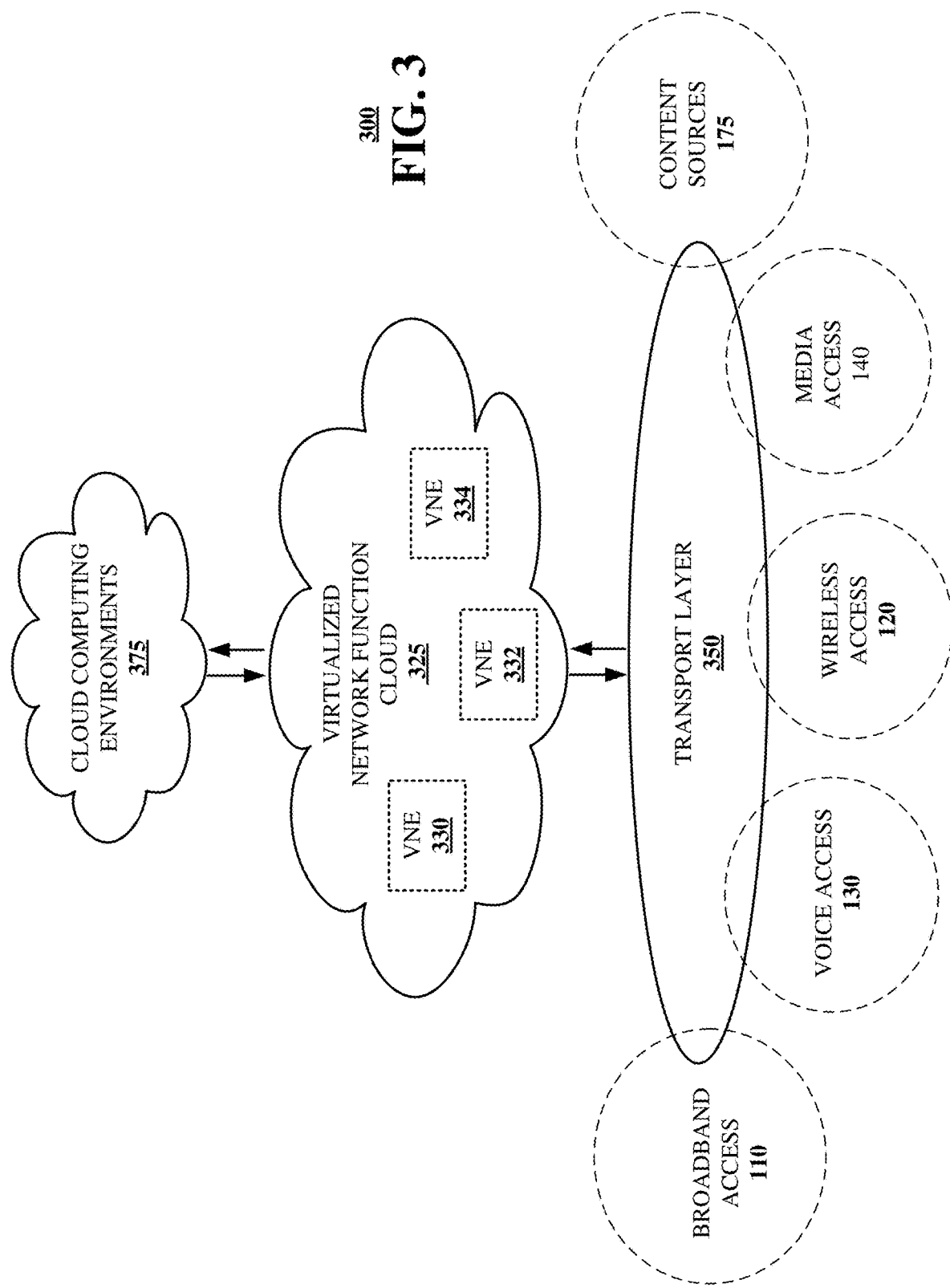

METHOD AND APPARATUS FOR SMART VIDEO SKIPPING

FIELD OF THE DISCLOSURE

The subject disclosure relates to a method and an apparatus for smart video skipping.

BACKGROUND

Modern telecommunications systems provide consumers with telephony capabilities while accessing a large variety of content. Consumers are no longer bound to specific locations when communicating with others or when enjoying multimedia content or accessing the varied resources available via the Internet. Network capabilities have expanded and have created additional interconnections and new opportunities for using mobile communication devices in a variety of situations. Intelligent devices offer new means for experiencing network interactions in ways that anticipate consumer desires and provide solutions to problems.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
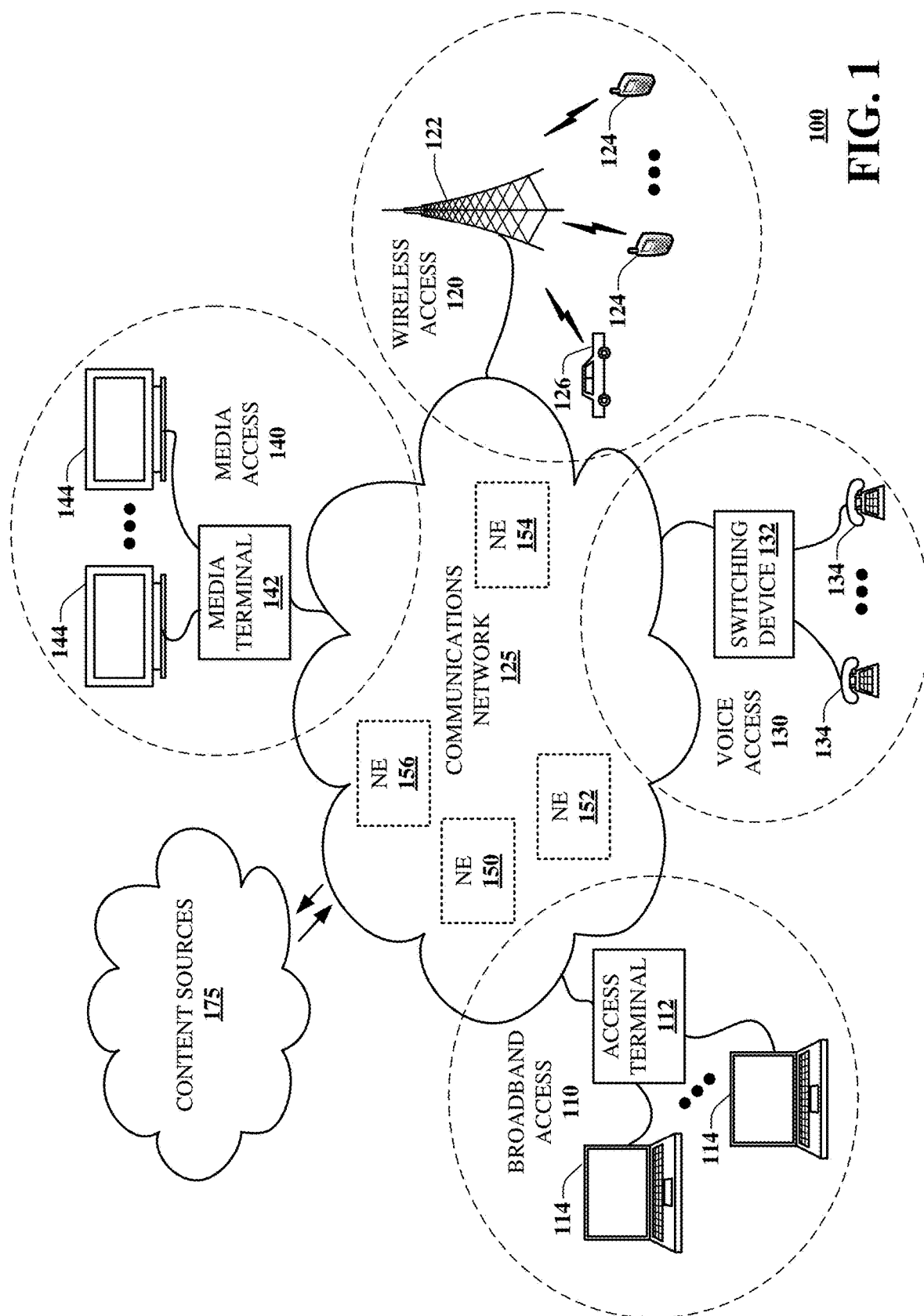
FIG. 1 is a block diagram illustrating an exemplary, non-limiting embodiment of a communications network in accordance with various aspects described herein.

The subject disclosure describes, among other things, illustrative embodiments for smart video skipping. A media content item can include a plurality of segments. For each content segment, the content segment can be compared to a prior content segment to a content transition. The content segment can be analyzed to identify a content marker. The content segment and content transition can be used to determine a viewing characteristic of the content segment. The viewing characteristic can be used to determine if the content segment is unnecessary. If the content segment is found to be unnecessary, then a set of skipping instructions can be updated. The skipping instructions can be used during a presentation of the media content item. Other embodiments are described in the subject disclosure.

One or more aspects of the subject disclosure include a method, performing operations by a processing system including a processor. The method can include obtaining a first media content item comprising a plurality of content segments. The method can also include accessing historic skipping data including segment characteristics associated with media content segments that have been previously skipped over during presentation. For each content segment of the plurality of content segments of the first media content item, the method can further include comparing, by the processing system, the content segment and a prior content segment to identify a content transition. The method can include analyzing, by the processing system, the content segment to identify a content marker in the content segment and, in turn, determining a viewing characteristic of the content segment according to the content transition and the content marker. The method can include determining if the content segment is unnecessary according to the viewing characteristic and the historic skipping data and, in turn, updating a set of skipping instructions associated with the first media content item responsive to the determining the content segment is unnecessary. The method can also include presenting the first media content item at a first device according to the set of skipping instructions associated with the first media content item.

One or more aspects of the subject disclosure include a device, including a processing system including a processor and a memory that stores executable instructions that, when executed by the processing system, facilitate performance of operations. The operations can include obtaining a first media content item comprising a plurality of content segments. The operations can also include accessing limitation information associated with a first user. For each content segment of the plurality of content segments, the operations can further include comparing the content segment and a prior content segment to identify a content transition and analyzing the content segment to identify a content marker in the content segment. The operations can include determining a viewing characteristic of the content segment according to the content transition and the content marker and, in turn, determining if the content segment is unnecessary according to the viewing characteristic and the limitation information associated with the first user. The operations can further include updating a set of skipping instructions associated with the first media content item responsive to the determining the content segment is unnecessary. The operations can include presenting the first media content item at a first device associated with the first user according to the set of skipping instructions associated with the first media content item.

One or more aspects of the subject disclosure include a machine-readable medium, comprising executable instructions that, when executed by a processing system including a processor, facilitate performance of operations. The operations can include obtaining a first media content item comprising a plurality of content segments. For each content segment of the plurality of content segments, the operations can also include comparing the content segment and a prior content segment to identify a content transition and analyzing the content segment to identify a content marker in the content segment. The operations can further include determining a viewing characteristic of the content segment according to the content transition and the content marker and, in turn, determining if the content segment is unnecessary according to the viewing characteristic. The operations can include updating a set of skipping instructions associated with the first media content item responsive to the determining the content segment is unnecessary. The operations can also include presenting the first media content item at a first device according to the set of skipping instructions associated with the first media content item.

Referring now to FIG. 1, a block diagram is shown illustrating an example, non-limiting embodiment of a system 100 in accordance with various aspects described herein. For example, system 100 can facilitate in whole or in part smart video skipping. A media content item can include a plurality of segments. For each content segment, the content segment can be compared to a prior content segment to a content transition. The content segment can be analyzed to identify a content marker. The content segment and content transition can be used to determine a viewing characteristic of the content segment. The viewing characteristic can be used to determine if the content segment is unnecessary. If the content segment is found to be unnecessary, then a set of skipping instructions can be updated. The skipping instructions can be used during a presentation of the media content item.

In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
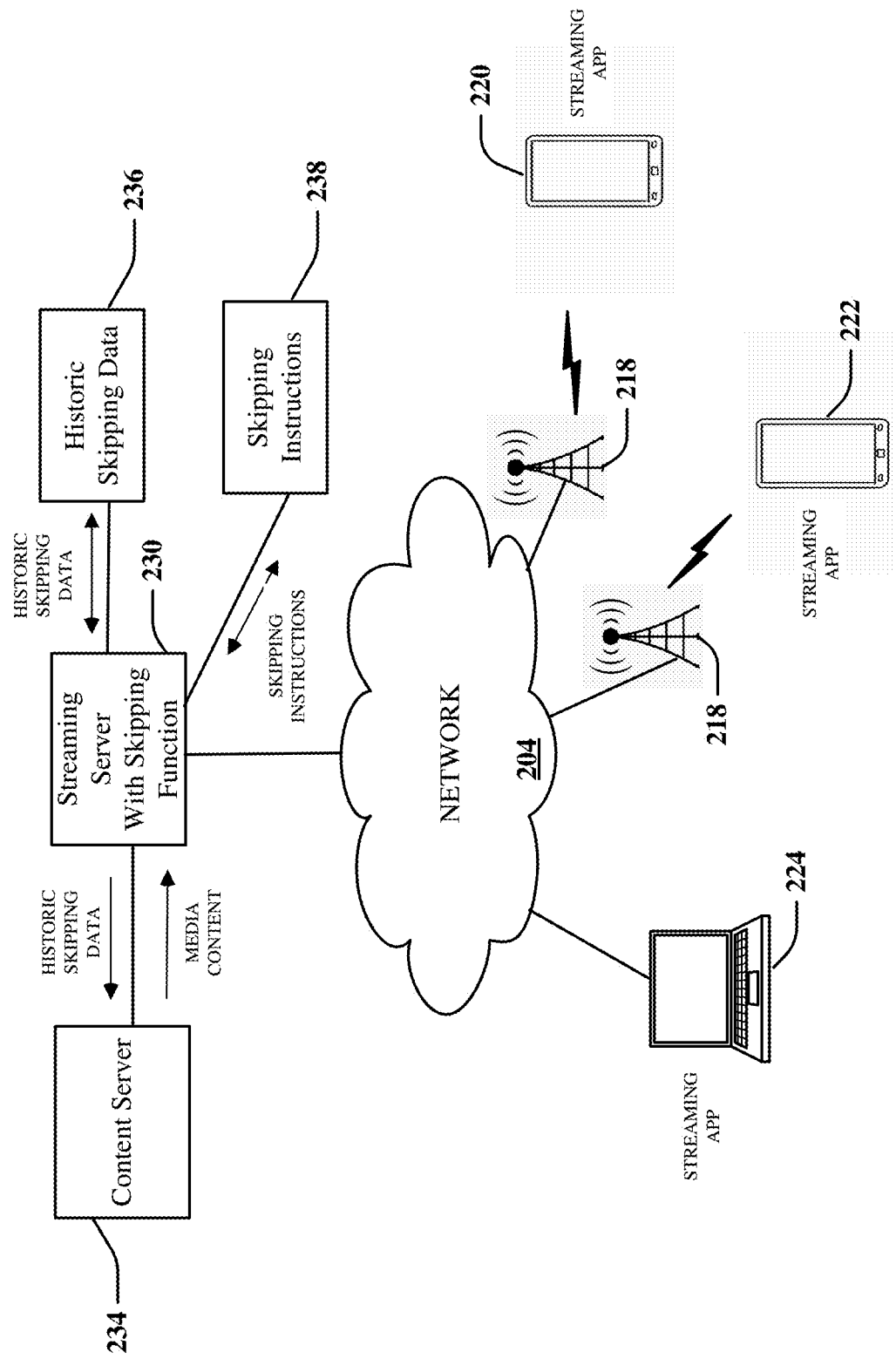
FIG. 2A is a block diagram illustrating an example, non-limiting embodiment of a system for of FIG. 1 in accordance with various aspects described herein.

FIG. 2A is a block diagram illustrating an example, non-limiting embodiment of a system 200 functioning within the communication network of FIG. 1 in accordance with various aspects described herein. In one or more embodiments, the system 200 can facilitate smart video skipping. The system 200 can include a streaming service 230 executing at, for example, a server. The system can also include a video application, such as a streaming application, executing at a user device 220-224. In one or more embodiments, the streaming service 230 can stream content to the user devices 220-224 via a wired (Ethernet) connection or a wireless connection, such as a wireless local area network (LAN), or a wireless network including cellular base stations 218. The user devices 220-224 can include computer devices 224 and mobile devices 220, 222. In one or more embodiments, each media content item can be partitioned into content segments. For example, a media content item can be partitioned into n content segments. The content segments can be individual frames of video. The content segments can be scenes.

In one or more embodiments, the streaming server 230 can include an automated skipping function for improving the reproduction and presentation of streaming video content to user devices 220. The streaming server 230 can include an ability to customize the watching of videos and movies by automatically finding and skipping to a next best frame of video content. The streaming server 230 can provide an ability to watch a movie or other content in a way that a user is likely to want to view this content by emulating an automated skipping of extraneous content "as if" the user had chosen to manually skip this content. In one or more embodiments, the smart video skipping, editing, and content rating can use machine learning (ML) techniques to detect features within content, such as video frames or video scenes, content transitions, and/or content markers. These detected features can be further distilled into content characteristics, such as genres and/or styles. The content characteristics that have been thus identified can be combined with historic skipping information 236 for this user and/or for a group of users to automatically determine which content is necessary or unnecessary (or otherwise preferred or not preferred) to the user experience. The unnecessary content can be skipped over by generating skipping instructions 238, which can be used by a content player at a user device 220.

In one or more embodiments, the streaming server 230 can provide direct feedback to a content server 232 by tracking statistics of how user skips content and which content they tend to skip. Media content editors and/or directors, whether human or virtual, can use this historic skipping information to direct them toward identifying video frames and/or scenes that are essential or determined to be significant for understanding the media content (and, conversely, identifying those frames that are not essential or not significant for understanding the media content). Also, media content editors and/or directors can use the historic skipping information to identify frames and/or scenes within a media content item that fit within different genres or viewing preferences of individual views and/or groups of viewers. By identifying these different genres, automatically, at a frame or scene level, these content items can be edited or tailored by the content creators to specifically remove content that is likely to be skipped over.

It is found that many viewers watch certain movies/videos for certain scenes, even if they are not particularly interested in the genre of the material or the rating of the material. Currently, video rewinding and fast-forwarding techniques in video presentation software use periodic skips. For example, a typical one-shot fast-forward/rewind button may be programmed for +/−10 seconds or +/−30 seconds. Alternatively, a manual and continuous fast-forward/rewind may require viewers to stop the process at some point in the presentation to locate, where they wish return to the presentation of the media content. These types of manual techniques are found to be very inefficient and/or inaccurate in practice and frustrating for viewers. For example, someone may be viewing a tutorial video and may want to skip past an introductory talking section to just watch the key actions of the tutorial. With current methods, such as the 10 second forwarding or manual forwarding methods, it can be quite difficult for the viewer to quickly and accurately land on the scenes/frames they want to watch.

In one or more embodiments, the streaming server 230 can use historic skipping data 236 modeling and Machine Learning (ML) techniques can be used to predict the best, next scene to forward/skip to, to rate each scene, and/or to allow users to edit views/scenes. In one or more embodiments, the streaming server 230 can use K-means or other ML algorithms. The streaming server 230 can analyze frames and/or scenes of media content to cluster and/or categorize these frames/scenes by learning how to compare and detect differences in video and audio. The streaming server 230 can use these detected differences in video and audio to cluster and/or categorize between background/foreground scenes and background audios.

In one or more embodiments, the streaming server 230 can analyze video from media content to detect image background transitions. For example, image and/or pixel recognition technologies can be used to recognize when the background scenery transitions from outdoor scenery to indoor scenery (or visa versa). Similarly, the streaming server 230 can use image and/or pixel recognition to detect a transition in the brightness of the background of a frame and/or scene. In another example, the streaming server 230 can identify and recognize a transition between sharpness of colors.

In one or more embodiments, the streaming server 230 can analyze audio from media content to detect audio transitions. For example, audio recognition technologies can be used to recognize a change in music, a transition from no music to music, from music to no music, and/or a music to voices (or voices to music). The streaming server 230 can detect a change in tone of music and/or a change in tone of voices. For example, the analysis can detect movement between happy or upbeat music and somber or scary music. The analysis can detect a change between different moods of voices, such as between conversational tones and angry tones.

In one or more embodiments, the streaming server 230 can analyze video of the media content to detect and/or recognize faces in the video content. Image and/or pixel recognition technology can be used to recognize the presence of faces and/or to recognize faces belonging to identifiable people. In one example, the streaming server 230 can recognize a transition between one face to another and/or a transition between no people (no faces) and a face or a group of faces. The streaming server 230 can recognize a transition to a known or identified face of a person.

In one or more embodiments, the streaming server 230 can analyze video of the media content to detect edited content, such as content edited via PhotoShop™, using video and/or image editing techniques. Similarly, the streaming server 230 can recognize if frames have been added or pasted into the media content. The streaming server 230 can analyze the video and audio content to identify instances, where video and audio files have been merged. In another example, the streaming server 230 can detect specific markers on video frames, where these markers signify video frames, which are different from traditional video frames.

In one or more embodiments, the streaming server 230 can recognize transitions of content, tone, backgrounds, and so on. The ML algorithm can further use these transition keys as markers to detect changes in tone, genre, and/or rating for a media content item. For example, a section of content that is relatively more violent can be accompanied by a transition in music, lighting, scenery, faces, and the like. Similarly, a section of content may transition between from one genre to another genre. These genres can be detected based on transition markers in the content.

In one or more embodiments, the ML algorithm can model these transitions as differences or differentials between scenes and/or frames according to the following, simplified model, as follows:

$$\text{Model FF} = \text{Scenery}_{diff} + \text{Brightness}_{diff} + \text{Music Background}_{diff} + \text{Voice Tone}_{diff} + \text{Facial}_{diff} + \text{Frame Count}_{diff} + \text{Sharpness}_{diff} + \text{Merges}_{diff}$$

Transitions between an outdoor scenery and an indoor scenery can be modeled as $\text{Scenery}_{diff} = \text{Scenery}(t_n) - \text{Scenery}(t_{n-1})$. Transitions between backgrounds of different brightness can be modeled as $\text{Brightness}_{diff} = \text{Brightness}(t_n) - \text{Brightness}(t_{n-1})$. Transitions between different music/audio backgrounds can be modeled as $\text{Music Background}_{diff} = \text{Music Background}(t_n) - \text{Music Background}(t_{n-1})$. Transitions between voice tones can be modeled as $\text{Voice Tone}_{diff} = \text{Voice Tone}(t_n) - \text{Voice Tone}(t_{n-1})$. Transitions between faces can be modeled as $\text{Facial}_{diff} = \text{Facial}(t_n) - \text{Facial}(t_{n-1})$. Transitions between frame counts (for recognizing frames added or pasted) can be modeled as $\text{Frame Count}_{diff} = \text{Frame Count}(t_n) - \text{Frame Count}(t_{n-1})$. Transitions between color sharpness can be modeled as $\text{Sharpness}_{diff} = \text{Sharpness}(t_n) - \text{Sharpness}(t_{n-1})$. Transitions between an amount of merging in data can be modeled as $\text{Merges}_{diff} = \text{Merges}(t_n) - \text{Merges}(t_{n-1})$.

In one or more embodiments, historic skipping data 236 can be collected and analyzed by the streaming server 230. A model of the historic skipping data 236 can be generated for a user community as well as for a particular viewer who is watching media content. A ML model can self-learn using, for example, neuro-networking methods. The historic skipping model can predict which content will most likely be skipped based on what has been skipped before. For example, the historic skipping model can learn from other viewers that watched a particular video in the past and skipped certain scenes. This information can be used to train the model to predict what users will want to skip in the future. In turn, these predictions can be used to preemptively skip these same frames/scenes/sections of the content when the video is streamed and reproduced for users. In one or more embodiments, one or more of the other viewers can be determined to have similar characteristics as the user. For example, the particular viewer and other viewers could share one or more common interests, such a common interest in technology, based on consumption history, known employer, and so on. Further, the streaming server 230 can determine that this group of viewers are found to historically skip general introductions in tutorials.

In one or more embodiments, the streaming server 230 can learn from historic skipping information associated with a particular user, viewer, or subscriber. The historic skipping information can provide the streaming server 230 with a catalog of past skipping that occurred as the user watched various media content. The streaming server 230 can combine this historic skipping information with frame differentiation (identification of transition/genre/content information) as described above. So, for example, historic skipping information associated with a particular item of media content can be cross referenced to transition/genre/content information associated with the particular scenes/frames of the media content which the user decided to skip. In this way, a model can be developed, via ML, which can predict this user's likely response to another media content item once that item has been similarly characterized at the frame/scene level. So, if the model determines that, for example, this user typically skips certain genres of content or certain types of scenes, then the model can be applied to new content items for which the genre/scene information has been detected and catalogued. A set of automatic skipping instructions can be generated by the streaming server 230 and stored in a skipping instruction database 238. Subsequently, the streaming server 230 can use these skipping instructions to modify the content that is sent to this user's streaming application at their mobile device 220. For example, the streaming content can be substantially shortened, via the skipping instructions. In another example, the streaming content can exclude one or more scenes, which the streaming server 230 predicts will not be of interest to this user.

In one or more embodiments, the streaming server 230 can provide the historic skipping data to content servers 234. For example, video editors/directors and/or video editing software can use the historic skipping data from a group of viewers to drive editing of content. A smart edit function can flag scenes or frames of content based on the historic skipping data. By proactively skipping content as unnecessary to understanding media content, then the run time of this media content can be reduced. For example, a 2.5 hour long movie can be trimmed down to 45 mins by preemptively skipping "unnecessary" sections.

In one or more embodiments, a specific genre of movies can be minimized and watched according to a specific genre. That is scenes or frames that are not part of the selected genre can be treated as non-essential to a viewer's understanding of the content. This non-essential content can be skipped over. As a result, a romantic movie can be watched as an action-only movie.

In one or more embodiments, a particular rating can be applied to media content. For example, a maximum rating (such as PG-13) can be applied to the media content. Any scenes/frames of the media content that exceed this maximum rating can be skipped. In this case, the streaming server 230 can determine ratings of all of the scenes or frames of the content. The streaming server 230 can apply the maximum rating as a filter to these scenes/frames such that any content that exceeds the maximum rating is automatically skipped over. In this way, movies can be minimized (skipping over anything in excess of the maximum rating) and watched according to and the skipping instructions. In this way, an R rated movie can be watched as a shortened PG-13 movie via an automatically generated, skipping instruction set.

In one or more embodiments, the streaming server 230 can allow viewers to watch a customized version of a movie (or other content) without even having to skip or forward. Each individual viewer can have their own version of the movie. In one or more embodiments, scene and frame differentiation and categorization can be used to create a rating index on a per scene basis. Viewers can select what they want to skip based on ratings.

In one or more embodiments, a combination of these factors can allow viewers to use a smart skip or smart forward/rewind button to skip to a section of the video that they intend to move to—rather than just utilizing the regular 10 second skip or manual skipping methods. Alternatively, a movie can be automatically adapted to what the view likes by selecting the smart edit features. In addition, the smart skipping method can record statistics of frames that were skipped and can provide these recorded statistics to content providers with direct feedback of what was skipped in their content. This feedback can provide insight to the content maker so they can alter their content and/or generate their own preemptively skipped (edited) versions. Further, the recorded statistical feedback can serve as an input for training the ML model mentioned above.

In one or more embodiments, customer satisfaction can be improved as the streaming server and/or streaming application can automatically skip over unwanted sections of content while focusing on those sections of most interest to the viewer. In addition, direct feedback of recorded skipping statistics can allow video makers (content providers) to create more desirable content up front.

Figure 2B:
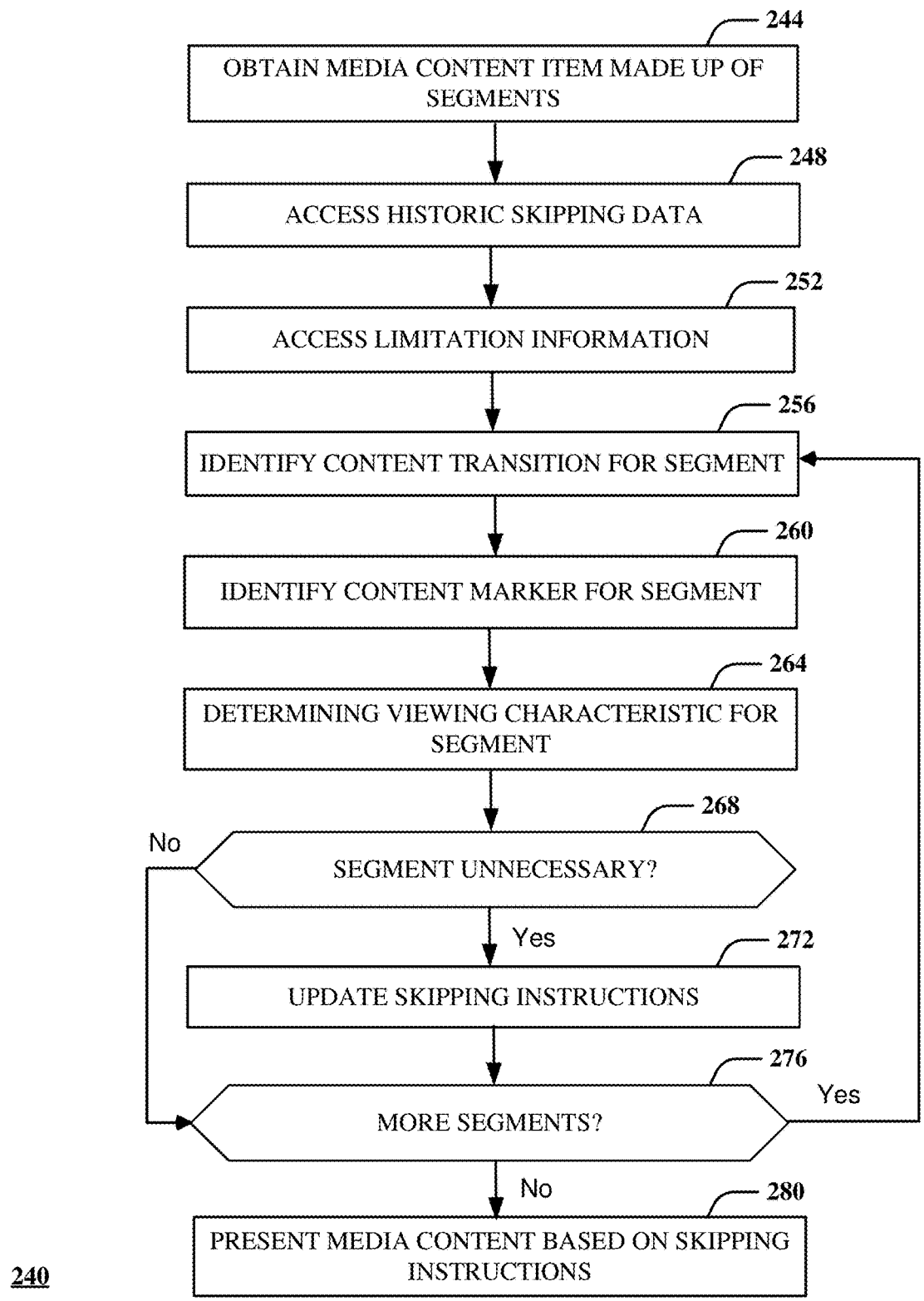
FIG. 2B depicts an illustrative embodiment of a method in accordance with various aspects described herein.

FIG. 2B depicts an illustrative embodiment of a method 240 in accordance with various aspects described herein. While for purposes of simplicity of explanation, the respective processes are shown and described as a series of blocks in FIG. 2B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. At step 244, media content can be obtained from a content provider. This media content can be made up of content segments, scenes, and/or frames. At step 248, historic skipping data can be accessed. This historic skipping data can be associated with one or more particular users and/or associated with a group of users. At step 252, limitation information can be accessed. The limitation information can be a genre or a maximum rating. The limitation information can be associated with one or more known users and/or associated with a group of users.

At steps 256-276, the content item can be analyzed at the segment level. The analysis can identify content transitions at the segment level, at step 256, and content markers at the segment level, at step 260. The analysis can determine viewing characteristics (genre, ratings) based on the transitions and markers that are identified, at step 264. At step 268, the analysis can determine if the segment is "unnecessary" for this viewer based on the viewing characteristics for the segment and the historic skipping data and/or limitation information for this viewer (or for a group of viewers). If the segment is determined, in step 268, to be "unnecessary," then, in step 272, the analysis can update skipping instructions for this media content item to cause the "unnecessary" segment to be skipped. If the segment is not determined to be "unnecessary," in stop 268, then the analysis can determine, in step 276, if there are more segments to analyze, and, if so, then repeat steps 256-276. If there are no more segments, then the media content item can be presented based on the skipping instructions, in step 280.

While for purposes of simplicity of explanation, the respective processes are shown and described as a series of blocks in FIG. 2B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200, and method 230 presented in FIGS. 1, 2A, 2B, and 3. For example, virtualized communication network 300 can facilitate in whole or in part smart video skipping. A media content item can include a plurality of segments. For each content segment, the content segment can be compared to a prior content segment to a content transition. The content segment can be analyzed to identify a content marker. The content segment and content transition can be used to determine a viewing characteristic of the content segment. The viewing characteristic can be used to determine if the content segment is unnecessary. If the content segment is found to be unnecessary, then a set of skipping instructions can be updated. The skipping instructions can be used during a presentation of the media content item.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic, so the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
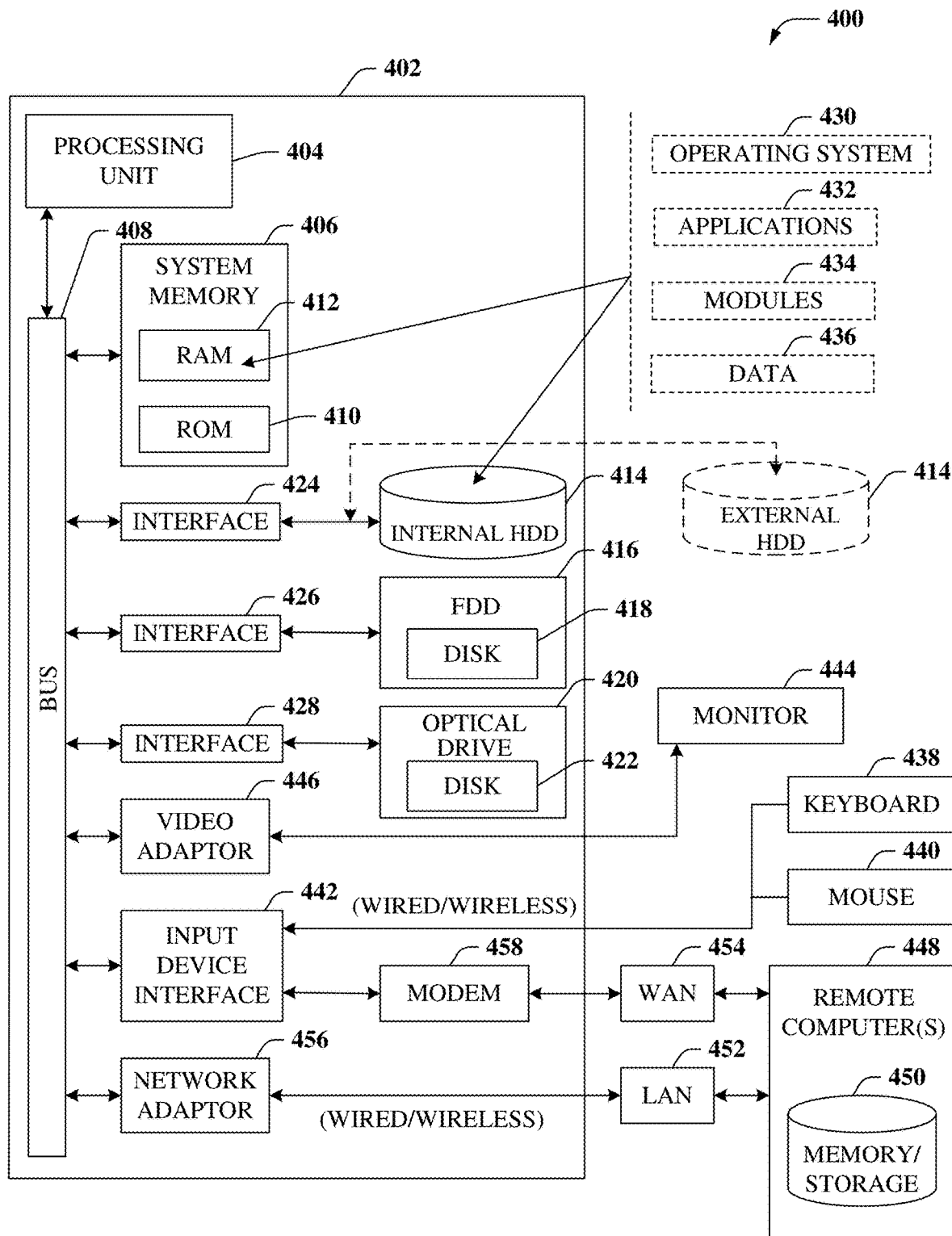
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part smart video skipping. A media content item can include a plurality of segments. For each content segment, the content segment can be compared to a prior content segment to a content transition. The content segment can be analyzed to identify a content marker. The content segment and content transition can be used to determine a viewing characteristic of the content segment. The viewing characteristic can be used to determine if the content segment is unnecessary. If the content segment is found to be unnecessary, then a set of skipping instructions can be updated. The skipping instructions can be used during a presentation of the media content item Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices. Other examples of computing systems include wearable device, such as smart glasses, personal monitoring devices, and virtual reality goggles.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a wearable device, such as smart glasses, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out, anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
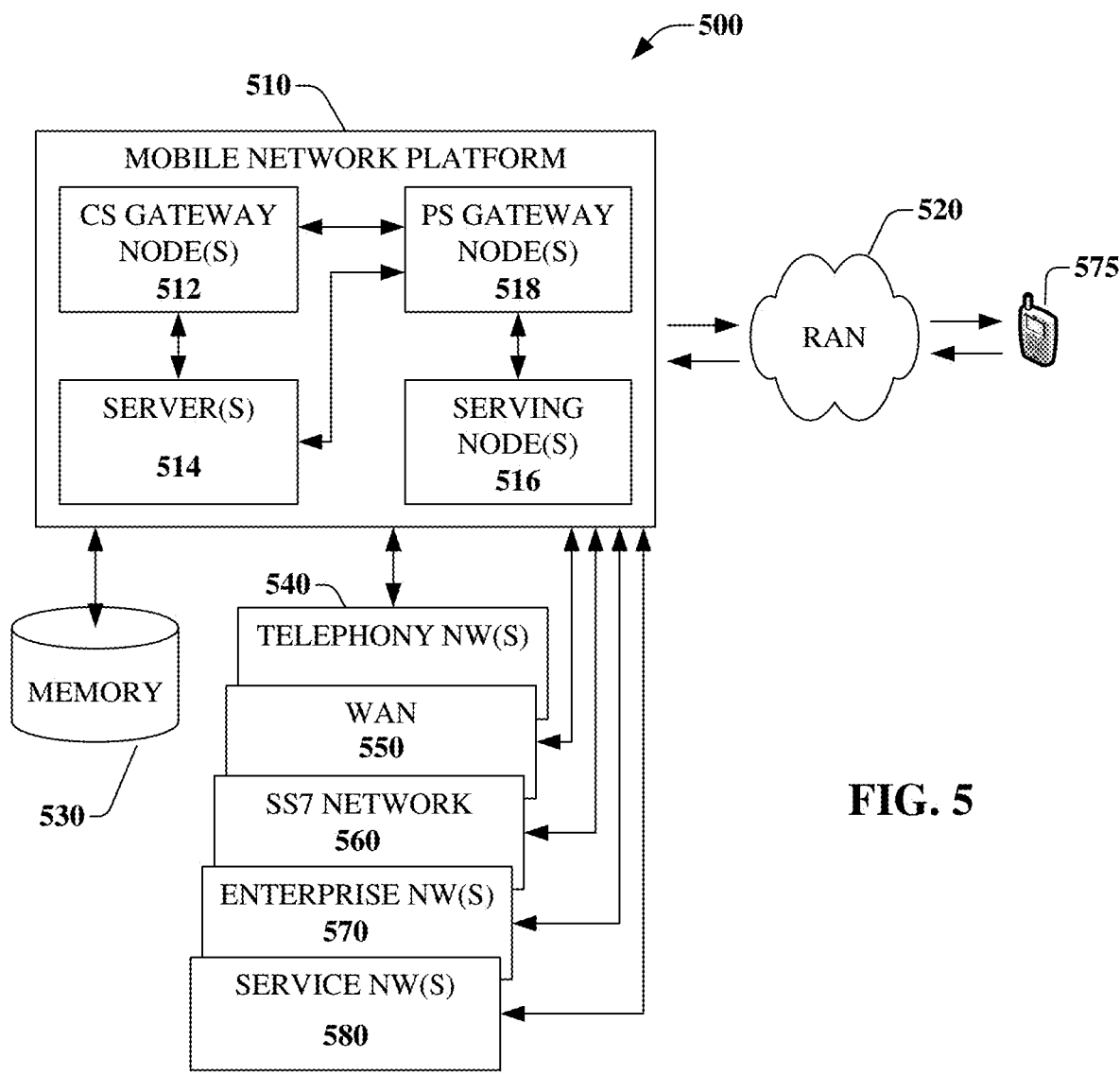
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part smart video skipping. A media content item can include a plurality of segments. For each content segment, the content segment can be compared to a prior content segment to a content transition. The content segment can be analyzed to identify a content marker. The content segment and content transition can be used to determine a viewing characteristic of the content segment. The viewing characteristic can be used to determine if the content segment is unnecessary. If the content segment is found to be unnecessary, then a set of skipping instructions can be updated. The skipping instructions can be used during a presentation of the media content item.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers;

and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
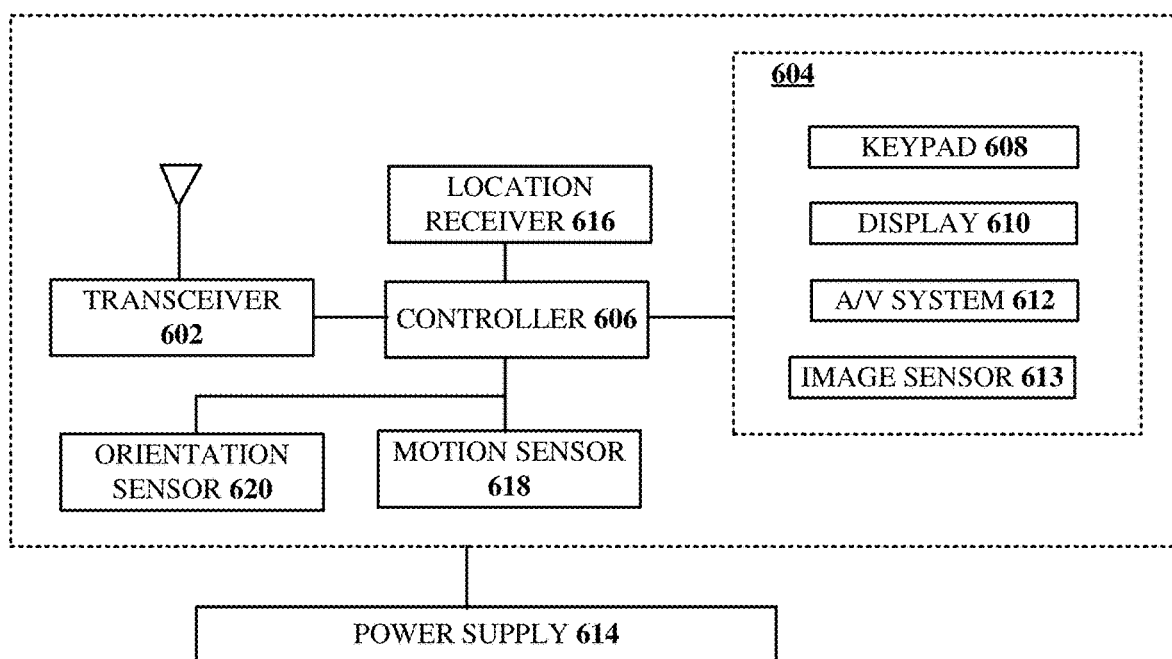
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part smart video skipping. A media content item can include a plurality of segments. For each content segment, the content segment can be compared to a prior content segment to a content transition. The content segment can be analyzed to identify a content marker. The content segment and content transition can be used to determine a viewing characteristic of the content segment. The viewing characteristic can be used to determine if the content segment is unnecessary. If the content segment is found to be unnecessary, then a set of skipping instructions can be updated. The skipping instructions can be used during a presentation of the media content item.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historic information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method, comprising:
   obtaining, by a processing system including a processor, a first media content item comprising a plurality of content segments;
   accessing, by the processing system, limitation information and historic skipping data that includes segment characteristics associated with media content segments that have been previously skipped over during presentation;
   determining, by the processing system, genre information based on the segment characteristics included in the historic skipping data, and determining, by the processing system, a maximum rating to apply to the first media content item based on the limitation information;
   detecting, by the processing system, content transitions in the first media content item to cluster and categorize content data in the plurality of content segments of the first media content item, wherein the detecting the content transitions in the first media content item comprises performing an analysis of the first media content item to identify transitions between frames that have been edited by a video or image editing application and frames that have not been edited by a video or image editing application, transitions between frames that do not include any faces and frames that include a particular face or a group of faces, and transitions between frames associated with speech in a determined conversational tone and frames associated with speech in a determined angry tone;
   responsive to the detecting the content transitions, for each content segment of the plurality of content segments of the first media content item:
      analyzing, by the processing system, the content segment to identify one or more content markers in the content segment;
      determining, by the processing system, a plurality of viewing characteristics of the content segment according to the one or more content markers, wherein the plurality of viewing characteristics includes a content rating associated with the content segment and a genre associated with the content segment;
      determining, by the processing system, if the content segment is unnecessary according to a first comparison of the maximum rating and the content rating associated with the content segment, and according to a second comparison of the genre information and the genre associated with the content segment; and
      updating, by the processing system, a set of skipping instructions associated with the first media content item responsive to determining that the content segment is unnecessary;
   modifying, by the processing system, the first media content item based on the set of skipping instructions associated with the first media content item, resulting in a modified first media content item, wherein the modified first media content item excludes any content segment of the plurality of content segments that is associated with a content rating that exceeds the maximum rating, and wherein the modified first media content item further excludes any content segment of the plurality of content segments that is associated with any genre identified in the genre information such that the modified first media content item is of a first particular genre that is different from an overall intended genre of the first media content item; and
   causing, by the processing system, the modified first media content item to be streamed to a first device for presenting by the first device.

2. The method of claim 1, wherein the overall intended genre of the first media content item comprises an action genre, and wherein the first particular genre of the modified first media content item comprises a romance genre.

3. The method of claim 1, wherein the maximum rating comprises a Restricted (R) rating, a parents strongly cautioned (PG-13) rating, a parental guidance suggested (PG) rating, or a general audiences (G) rating.

4. The method of claim 1, wherein the limitation information further includes a presentation runtime.

5. The method of claim 1, wherein the historic skipping data is associated with a first user.

6. The method of claim 1, wherein the historic skipping data is associated with a plurality of users.

7. The method of claim 1, wherein the plurality of content segments comprise video frames, scenes, or any combination thereof.

8. The method of claim 1, wherein one or more of the content transitions includes a transition of a video characteristic including color, sharpness, brightness, of any combination thereof.

9. The method of claim 1, wherein one or more of the content transitions includes a transition of an audio characteristic including sound, music, voice, or any combination thereof.

10. The method of claim 1, wherein the one or more content markers relate to faces, voice tone, mood, forms, scenery, or any combination thereof.

11. The method of claim 1, wherein the detecting the content transitions is further in accordance with a machine learning algorithm that models transitions as differentials between frames, and wherein the machine learning algorithm models transitions based on differences in scenery between frames, differences in brightness between frames, differences in background music between frames, and differences in amounts of merged data between frames.

12. The method of claim 2, further comprising modifying the first media content item based on a second set of skipping instructions that is derived according to second genre information and second limitation information that identifies a second maximum rating, resulting in a modified second media content item, and causing the modified second media content item to be streamed to a second device for presenting by the second device, wherein the modified second media content item excludes any content segment of the plurality of content segments that is associated with a content rating that exceeds the second maximum rating, and wherein the modified second media content item further excludes any content segment of the plurality of content segments that is associated with any genre identified in the second genre information such that the modified second media content item is of a second particular genre that is different from both the overall intended genre of the first media content item and the first particular genre of the modified first media content item.

13. A device, comprising:
   a processing system including a processor; and
   a memory that stores executable instructions that, when executed by the processing system, facilitate performance of operations, the operations comprising:
   obtaining a first media content item comprising a plurality of content segments;
   accessing limitation information associated with a first user and historic skipping data associated with media content segments that the first user has previously skipped over during presentation;
   determining genre information based on the historic skipping data, and determining a maximum rating to apply to the first media content item based on the limitation information;
   detecting content transitions in the first media content item to cluster and categorize content data in the plurality of content segments of the first media content item, wherein the detecting the content transitions in the first media content item comprises performing an analysis of the first media content item to identify transitions between frames that have been edited by a video or image editing application and frames that have not been edited by a video or image editing application, transitions between frames that do not include any faces and frames that include a particular face or a group of faces, and transitions between frames associated with speech in a determined conversational tone and frames associated with speech in a determined angry tone;
   responsive to the detecting the content transitions, for each content segment of the plurality of content segments of the first media content item:
   analyzing the content segment to identify one or more content markers in the content segment;
   determining a plurality of viewing characteristics of the content segment according to the one or more content markers, wherein the plurality of viewing characteristics includes a content rating associated with the content segment and a genre associated with the content segment;
   determining if the content segment is unnecessary according to a first comparison of the maximum rating and the content rating associated with the content segment, and according to a second comparison of the genre information and the genre associated with the content segment; and
   updating a set of skipping instructions associated with the first media content item responsive to determining that the content segment is unnecessary;
   modifying the first media content item based on the set of skipping instructions associated with the first media content item, resulting in a modified first media content item, wherein the modified first media content item excludes any content segment of the plurality of content segments that is associated with a content rating that exceeds the maximum rating, and wherein the modified first media content item further excludes any content segment of the plurality of content segments that is associated with any genre identified in the genre information such that the modified first media content item is of a first particular genre that is different from an overall intended genre of the first media content item; and
   causing the modified first media content item to be streamed to a first device associated with the first user for presenting by the first device.

14. The device of claim 13, wherein the overall intended genre of the first media content item comprises an action genre, and wherein the first particular genre of the modified first media content item comprises a romance genre.

15. The device of claim 13, wherein the limitation information further includes a presentation runtime.

16. The device of claim 13, wherein one or more of the content transitions includes a transition of a video characteristic, an audio characteristic, or any combination thereof.

17. The device of claim 13, wherein the maximum rating comprises a Restricted (R) rating, a parents strongly cautioned (PG-13) rating, a parental guidance suggested (PG) rating, or a general audiences (G) rating.

18. A non-transitory machine-readable medium, comprising executable instructions that, when executed by a processing system including a processor, facilitate performance of operations, the operations comprising:
   obtaining a first media content item comprising a plurality of content segments;
   accessing limitation information and historic skipping data that includes segment characteristics associated with media content segments that have been previously skipped over during presentation;
   determining genre information based on the segment characteristics included in the historic skipping data, and determining a maximum rating to apply to the first media content item based on the limitation information;
   detecting content transitions in the first media content item to cluster and categorize content data in the plurality of content segments of the first media content item, wherein the detecting the content transitions in the first media content item comprises performing an analysis of the first media content item to identify transitions between frames that have been edited by a video or image editing application and frames that have not been edited by a video or image editing application, transitions between frames that do not include any faces and frames that include a particular face or a group of faces, and transitions between frames associated with speech in a determined conversational tone and frames associated with speech in a determined angry tone;

responsive to the detecting the content transitions, for each content segment of the plurality of content segments of the first media content item:

analyzing the content segment to identify one or more content markers in the content segment;

determining a plurality of viewing characteristics of the content segment according to the one or more content markers, wherein the plurality of viewing characteristics includes a content rating associated with the content segment and a genre associated with the content segment;

determining if the content segment is unnecessary according to a first comparison of the maximum rating and the content rating associated with the content segment, and according to a second comparison of the genre information and the genre associated with the content segment; and updating a set of skipping instructions associated with the first media content item responsive to determining that the content segment is unnecessary;

modifying the first media content item based on the set of skipping instructions associated with the first media content item, resulting in a modified first media content item, wherein the modified first media content item excludes any content segment of the plurality of content segments that is associated with a content rating that exceeds the maximum rating, and wherein the modified first media content item further excludes any content segment of the plurality of content segments that is associated with any genre identified in the genre information such that the modified first media content item is of a first particular genre that is different from an overall intended genre of the first media content item; and causing the modified first media content item to be streamed to a first device for presenting by the first device.

19. The non-transitory machine-readable medium of claim 18, wherein the overall intended genre of the first media content item comprises an action genre, and wherein the first particular genre of the modified first media content item comprises a romance genre.

20. The non-transitory machine-readable medium of claim 18, wherein the maximum rating comprises a Restricted (R) rating, a parents strongly cautioned (PG-13) rating, a parental guidance suggested (PG) rating, or a general audiences (G) rating.

* * * * *